United States Patent Office 2,712,023
Patented June 28, 1955

2,712,023
ALKYL SUBSTITUTED ANTIHISTAMINES

Donald Wallace Adamson, London, England, assignor to Burroughs Wellcome & Co. (U. S. A.) Inc., Tuckahoe, N. Y., a corporation of New York No Drawing. Application August 5, 1952,
Serial No. 302,821

Claims priority, application Great Britain July 20, 1948

9 Claims. (Cl. 260—296)

The present invention relates to new chemical compounds exhibiting anti-histamine activity, and particularly to a series of pyridyl allylamines of the general Formula I in which outstanding anti-histamine activity has been found:

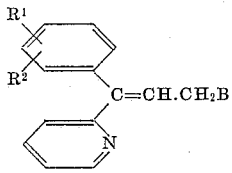

wherein $R^1$ and $R^2$ are alkyl groups of 1–4 carbon atoms and $R^2$ may also be H and B is an amino group of the class consisting of the dimethylamino, piperidino and pyrrolidino groups.

Of outstanding activity among these compounds is 1 - (4-methylphenyl)-1-(2-pyridyl)-3-pyrrolidinoprop-1-ene. These substances are prepared by dehydration under acid conditions of the corresponding tertiary amino carbinols obtained by reacting an appropriate β-tertiary-aminopropiophenone with 2-pyridyllithium. These dehydrations have been found to furnish mixtures of two geometrical isomers, differing in the cis and trans relationship of the CH₂B group with the 2-pyridyl group, as illustrated in Formulae II and III.

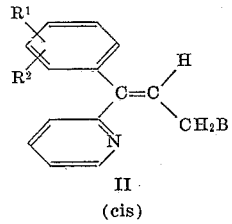
II
(cis)

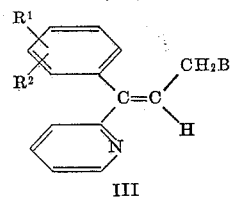
III
(trans)

In each case the trans isomer is considerably more potent (20–150 times) as a histamine antagonist than the cis isomer. The isomers can be separated by a variety of procedures to be described later. As also described later, the relatively biologically inactive cis isomer may be converted into the required biologically active trans isomer, and also the conditions under which the dehydration of the carbinols is carried out may be so selected that the required trans isomer can be prepared in high yield substantially free from any cis isomer.

These geometrical isomers can be distinguished and identified by the absorption spectra of their oxalates in ethanolic solution. The following discussion relates to all the pairs of isomers except those in which the phenyl group carries an alkyl substituent in the ortho position; these exceptions are discussed separately. The cis isomers have an absorption spectrum resembling that of the corresponding substituted styrene in having a strong absorption band at between 250 and 261 mµ (in several examples a second band appears at between 229 and 235 mµ). In contrast, the trans isomer has an intense absorption band at between 233 and 241 mµ and a somewhat weaker but still strong band at between 280 and 283 mµ. This latter spectrum resembles closely that of 2-vinylpyridine whose absorption peaks are at 235 and 179 mµ.

The probable explanation of this phenomenon is that in molecules of this type there is insufficient room for both the 2-pyridyl and the phenyl groups to be co-planar with each other and with the ethylenic group. One of the two cyclic groups is thus forced out of the plane of the ethylenic group, electronic interaction is impossible and this cyclic group makes little contribution to the absorption spectrum. Thus, it is believed that in that isomer which has an absorption spectrum similar to 2-vinylpyridine, the pyridyl group is co-planar with the ethylenic bond, while in the other isomer, it is the substituted phenyl group which is in the same plane as the ethylenic bond. It is further believed that the cyclic group remote from the aminomethylene group for steric reasons can more readily assume the co-planar position, that is, that isomer which has an absorption spectrum similar to 2-vinylpyridine is the trans isomer, and that which has an absorption spectrum similar to styrene is the cis isomer.

The absorption spectra also serve for the characterization of the cis and trans isomers of allylamines (I) in which the phenyl group is substituted by an alkyl group in the ortho position. In this case the trans isomer oxalate in ethanolic solution as before has a spectrum very similar to that of 2-vinylpyridine. However, the cis isomer oxalate in ethanolic solution also has a spectrum more like that of 2-vinylpyridine than that of styrene, although it is still possible to identify each by comparison of these spectra. A clearcut distinction is provided by observing the difference in absorption spectra between those measured in ethanolic solution as above, and those measured in strong acid solution (e. g., 5 N hydrochloric acid).

The wave-length of maximum absorption at ca. 281 mµ of the trans isomer oxalate, as determined in ethanolic solution, is changed to ca. 294 mµ and the intensity increased when the determination is carried out in acid solution (the peak at 237 mµ in ethanolic solution is no longer apparent). In contrast, it is difficult to discern any wave-length of maximum absorption of the cis isomer oxalates in acid solution (which have peaks at ca. 237 and 281 mµ in ethanolic solution) the peaks being replaced by the broad bands or completely eliminated.

The probable explanation of this phenomenon is that even in the cis isomer the substituted phenyl group is prevented by the ortho-substituent from entering the same plane as the ethylenic group, thus allowing the 2-pyridyl group to approximate to co-planarity in both isomers. In acid solution, the sterically unhindered 2-pyridyl group of the trans isomer is free to add a proton with the expected change in the absorption spectra on passing from a pyridyl base to a pyridyl salt. In the case of the cis isomer in acid solution, it is conjectured that steric hindrance will not allow the 2-pyridyl group to add a proton while remaining in the co-planar position relative to the ethylenic group, and thus the characteristic peak of light absorption does not appear in the spectrum.

Under most conditions of dehydration (e. g. by sulphuric acid at steam-bath temperatures) a mixture of cis and trans isomers is formed. The separation of the isomers can be accomplished by a number of methods, e. g., fractional crystallization of a salt, chromatography on an alumina column, or separation by base-exchange chromatography. The last mentioned method is the preferred one and the general method employed is described later. It has also been found that the cis isomers are selectively destroyed by heating with acetic anhydride, thereby permitting ready isolation of trans isomers. Also, the cis isomers are the less stable and can be converted into the trans isomers by heating with strong acids (e. g., sulphuric acid), thereby permitting a mixture of cis-trans isomers to be converted wholly into the trans isomer.

It will be understood, however, that it is highly preferable to select conditions of dehydration of the carbinol that will lead to the exclusive formation of the required trans isomer, rather than produce the mixture of isomers and then separate and reject the unwanted cis isomer or convert it, as described later, into trans isomer. It is found that heating the carbinols with 3 parts by weight of the aqueous sulphuric acid (85% v./v.) for 10 minutes at 165° leads exclusively to the trans isomer. These dehydration conditions are convenient in practice, but other conditions, for example, heating at the same temperature for a longer period with weaker sulphuric acid, or heating at a lower temperature for a longer period with the same concentration of sulphuric acid may also be employed with success. In general, raising the temperature and the concentration of sulphuric acid lead to the desired result of forming the trans isomer exclusively, but beyond a certain limit the trans isomer itself may be attacked, and it is preferable to keep within the lower limits of the range in which no unwanted isomer is produced. Treating the cis isomer under the same conditions which produce only trans isomer from carbinol, are found to convert it into trans isomer. No doubt the underlying mechanism is the same in the two cases.

*Separation of the isomeric anti-histamines by base-exchange chromatography*

A column of sulphonated cross-linked polystyrene of a low degree of cross-linkage (e. g., 2¼% nominal) and mesh size of the order of 250 μ in the wet state, of dimensions such that the length is a large multiple (e. g., 30:1) of the diameter, is prepared by pouring a suspension of the resin in aqueous alcohol from which the dissolved air has been removed by short treatment in a vacuum. The proportions of alcohol and water are such as to maintain in solution about 20% of the mixed bases, the separation of which is desired. A quantity of the mixed bases, prepared in 20% solution as described, and such that it will exhaust about two-thirds of the resin, ascertained by prior experiment, is absorbed in the resin under a small head of pressure. The column is now washed with sufficient alcohol of the same aqueous concentration to remove all non-basic, including colored, material. The column is now irrigated with a solution of a base of significantly greater basic strength than the mixed bases it is sought to separate and of such a concentration that a relatively large volume of such a solution is needed to exhaust the column. The effluent from the column is collected during this irrigation in small fractions in a large number of tubes by automatic or other means. The contents of the tubes are examined by each of three or more methods. (1) By smell, when the characteristic odor of the displacing agent indicates its break through, (2) by quenching of the fluorescence of Whatman 1 filter paper in filtered ultra-violet light of wave-length 2537 A. by the presence of a portion of absorbing material removed from a tube, (3) by determination of the pH of the contents of the tube, or of a portion of the effluent of the column at the moment of entering such tube and (4) by a determination of the ultra-violet absorption spectra of suitable diluted portions of the contents of the tubes.

The results of such examination enables a decision to be taken which tubes contain the desired material separated into clear-cut fractions. A small portion of the total material may require to be discarded or reworked as described above, where the bands issuing from the column overlap. The same applies to the fractions immediately preceding the break-through of the displacing base, but this is best chosen on the grounds of its ease of separation from the desired bases.

*Example 1*

Atomized lithium (26 g.; 3.75 atoms) and sodium-dried ether (200 cc.) are placed in a 3-l 3-necked flask fitted with a Herschberg stirrer, thermometer pocket and a water condenser closed by a calcium chloride tube. A slow stream of dry nitrogen is blown through the flask, which is cooled to −10° and n-butyl chloride (138 g.; 156 cc.; 1.5 moles) is run in with rapid stirring; the mixture is stirred for a further 30 minutes, and then cooled to −60°.

2-bromopyridine (193 g.; 1.22 moles) is then added dropwise over 20 minutes, the temperature of the reaction mixture being maintained at −50°±2°. The mixture is stirred for 10 minutes at −50° and p-methyl-ω-pyrrolidinopropiophenone (112.5 g.; 0.5 mole) in dry benzene is then added dropwise over ca. 30 minutes, at a temperature of −50°±2°. The mixture is stirred for a further 2 hours, the temperature being allowed to rise to −30° but no higher.

The mixture is poured on to excess ice, acidified with concentrated hydrochloric acid, the ether layer separated and extracted with water (1 x 200 cc.). The combined aqueous extracts are washed with ether (1 x 200 cc.), basified with 0.880 ammonia and extracted with chloroform (3 x 350 cc.); the extract is washed with water (2 x 100 cc.), dried over sodium sulphate, evaporated, and the residue extracted with boiling light petroleum (B. P. 60–80°; 10 volumes), filtered hot and evaporated to dryness. The residue is recrystallized from alcohol to give a cream solid (119 g.; 80%), M. P. 117–118°. Recrystallization gives 1-(4-methylphenyl)-1-(2-pyridyl)-3-pyrrolidonopronan-1-ol, M. P. 119–120°.

The 4-methyl-ω-pyrrolidinopropiophenone required as the starting product for the preparation of the carbinol is prepared by the Mannich reaction (Blicke, Organic Reactions, 1942, vol. I, p. 303; Adamson & Billinghurst, Journal of the Chemical Society, 1950, 1039) from 4-methylacetophenone and pyrrolidine. The hydrochloride has M. P. 170° with decomposition.

1 - (4 - methylphenyl) - 1 - (2 - pyridyl) - 3 - pyrrolidinopropan-1-ol (10.0 g.) is heated in a steam bath for 30 minutes with 85% aqueous sulphuric acid (30 cc.). The solution is then poured on to crushed ice, excess of ammonia solution added and the liberated oil extracted with light petroleum (B. P. 60–80°). The extract is dried over anhydrous sodium sulphate and the solvent evaporated to leave an amber syrup (8.8 g.) consisting of the cis and trans isomers of 1-(4-methylphenyl)-1-(2-pyridyl)-3-pyrrolidinoprop-1-ene. A solution of the mixture in 60% aqueous ethanol (75 cc.) is passed onto a column of sulphonated cross-linked polystyrene (of a low degree of cross-linkage, e. g., 2¼% nominal and mesh size of the order of 250 μ in the wet state) of dimensions 35 x 1½ cm. The column is washed with 60% aqueous ethanol and the bases displaced by 0.2 M. $NH_4^+$ in 60% ethanol. The effluent is collected in 68 tubes each containing ca. 5 cc. The bulked contents of tubes 31–45 and 49–68 which absorbed light maximally at 235 and 280 mμ and at 260 mμ respectively are converted to their oxalates. The trans isomer oxalate has M. P. 173–174° (decomp.) after recrystallization from methanol, and light absorption in ethanol: maxima; $\lambda$=232.5, 282.5 mμ; $\epsilon$=16,200, 8,200. The cis isomer oxalate has M. P. 149–150° (decomp.) after recrystallization from ethanol, and light absorption in ethanol: maxima $\lambda$=233,259 mμ; $\epsilon$=13,600, 13,800.

The monohydrochloride monohydrate of the trans isomer has M. P. 116½–118° (with softening at 114°) after recrystallization from water, and the corresponding monohydrobromide monohydrate has M. P. 119–121° after recrystallization from water.

*Example 2*

1 - (4 - methylphenyl) - 1 - (2 - pyridyl) - 3 - pyrrolidinopropan-1-ol (10.0 g.) is heated at 165° for 10 minutes with aqueous sulphuric acid (85%; 20 cc.). The basic product, obtained by working up as described in Example 1 is a sticky solid (8.3 g.). Conversion to the oxalate and recrystallization of this from methanol gives the pure oxalate of the trans isomer of 1-(4-methylphenyl)-1-(2-pyridyl)-3-pyrrolidinoprop-1-ene, M. P. 173–174° (decomp.).

*Example 3*

3 - dimethylamino - 1 - (4 - methylphenyl) - 1 - (2-pyridyl)propan-1-ol (10.0 g.), prepared by the method of Example 1, and having M. P. 86–87°, is dehydrated in the presence of aqueous sulphuric acid (85%; 30 cc.) by the method of Example 1, to give a mixture (9.2 g.) of the cis and trans isomers, of 3-dimethylamino-1-(4-methylphenyl)-1-(2-pyridyl)prop-1-ene. These are separated by the base-exchange method of Example 1 and converted to the oxalates. The trans isomer oxalate has M. P. 173–174° (decomp.) after recrystallization from ethanol, and light absorption in ethanol: maxima $\lambda=235, 280$ m$\mu$; $\epsilon=13,300, 6,980$. The cis isomer oxalate has M. P. 181–182° (decomp.) after recrystallization from ethanol, and light absorption in ethanol: maxima, $\lambda=233, 260$ m$\mu$; $\epsilon=13,400, 12,300$.

The hydrochloride of 4-methyl-$\omega$-dimethylaminopropiophenone, required as starting product for the preparation of the carbinol, has M. P. 168°.

*Example 4*

1 - (4 - methylphenyl) - 3 - piperidino - 1 - (2 - pyridyl)propan-1-ol, prepared by the method of Example 1, and having M. P. 85–86°, is dehydrated in the presence of aqueous sulphuric acid (85%), by the method of Example 1, to give a mixture of cis and trans isomers of 1 - (4 - methylphenyl) - 3 - piperidino - 1 - (2 - pyridyl)-prop-1-ene. These are separated by the base-exchange method of Example 1 and converted to the oxalates. The trans isomer oxalate has M. P. 164–165° (decomp.) after recrystallization from methanol, and light absorption in ethanol: maxima, $\lambda=233, 283$ m$\mu$; $\epsilon=13,000, 6,000$. The cis isomer oxalate has M. P. 167–169° (decomp.) after recrystallization from ethanol, and light absorption in ethanol: maxima, $\lambda=261$ m$\mu$; $\epsilon=13,500$.

The hydrochloride of 4-methyl-$\omega$-piperidinopropiophenone, required as starting product for the preparation of the carbinol, has M. P. 177–178° (decomp.).

*Example 5*

1 - (4 - ethylphenyl) - 1 - (2 - pyridyl) - 3 - pyrrolidinopropan-1-ol, prepared by the method of Example 1, and having M. P. 112–113°, is dehydrated with aqueous sulphuric acid (85%), by the method of Example 2, and worked up to give the oxalate of the trans isomer of 1-(4-ethylphenyl)-1-(2-pyridyl)-3-pyrrolidinoprop-1-ene, M. P. 153–154° (decomp.), after recrystallization from ethanol-ethyl acetate, and light absorption in ethanol: maxima, $\lambda=235, 282$ m$\mu$; $\epsilon=12,000, 5,500$.

The hydrochloride of 4-ethyl-$\omega$-pyrrolidinopropiophenone, required as starting product for the preparation of the carbinol, has M. P. 116–118°.

*Example 6*

1 - 4 - isopropylphenyl) - 1 - (2-pyridyl)-3-pyrrolidinopropan-1-ol, prepared by the method of Example 1, and having M. P. 83–84°, is converted by the method of Example 2, to the trans isomer of 1-(4-isopropylphenyl)-1-(2-pyridyl)-3-pyrrolidinoprop-1-ene, B. P. 154–156°/0.03 mm., light absorption in ethanol:maxima, $\lambda=236, 282$ m$\mu$; $\epsilon=10,500, 4,400$.

The oxalate has M. P. 166–167° (decomp.) after recrystallization from ethanol-ethyl acetate, and light absorption in ethanol:maxima, $\lambda=234, 281$ m$\mu$; $\epsilon=12,100, 5,700$.

The hydrochloride of 4-isopropyl-$\omega$-pyrrolidinopropiophenone, required as starting product for the preparation of the carbinol, has M. P. 167–168°.

*Example 7*

1 - (4 - tert.butylphenyl) - 1 - (2-pyridyl)-3-pyrrolidinopropan-1-ol, prepared by the method of Example 1, and having M. P. 120–121°, is dehydrated in the presence of aqueous sulphuric acid (85%) by the method of Example 1, to give a mixture of the cis and trans isomers of 1-(4-tert. butylphenyl)-1-(2-pyridyl)-3-pyrrolidinoprop-1-ene. These are separated by the base-exchange method of Example 1 and converted to the oxalates. The trans isomer oxalate has M. P. 165° (decomp.) after recrystallization from ethanol-ethyl acetate, and light absorption in ethanol: maxima, $\lambda=234, 281$ m$\mu$; $\epsilon=13,500, 6,600$. The cis isomer oxalate has M. P. 175° (decomp.) after recrystallization from ethanol-ethyl acetate, and light absorption in ethanol: maxima, $\lambda=235, 261$ m$\mu$; $\epsilon=15,000, 15,000$.

The hydrochloride of 4-tert. butyl-$\omega$-pyrrolidino-propiophenone, required as starting product for the preparation of the carbinol, has M. P. 157–158° (decomp.).

*Example 8*

1 - (3 - methylphenyl) - 1 - (2-pyridyl)-3-pyrrolidinopropan-1-ol, prepared by the method of Example 1, and having M. P. 54–55°, is dehydrated in the presence of aqueous sulphuric acid (85%), by the method of Example 1, to give a mixture of the cis and trans isomers of 1-(3-methylphenyl) - 1 - (2 - pyridyl)-3-pyrrolidinoprop-1-ene. These are separated by the base-exchange method of Example 1 and converted to the oxalates. The trans isomer oxalate has M. P. 147–148° (decomp.) after recrystallization from ethanol, and light absorption in ethanol: maxima, $\lambda=241, 282$ m$\mu$; $\epsilon=14,000, 8,600$. The cis isomer oxalate has M. P. 182–183° (decomp.) after recrystallization from methanol, and light absorption in ethanol: maximum, $\lambda=250$ m$\mu$; $\epsilon=12,000$.

The hydrochloride of 3-methyl-$\omega$-pyrrolidinopropiophenone required as starting product for the preparation of the carbinol, has M. P. 131–132°.

*Example 9*

1 - (3,4 - dimethylphenyl) - 1 - (2 - pyridyl) - 3-pyrrolidino-propan-1-ol, prepared by the method of Example 1, and having M. P. 104–105°, is dehydrated in the presence of aqueous sulphuric acid (85%), by the method of Example 1, to give a mixture of the cis and trans isomers of 1-(3,4-dimethyl-phenyl)-1-(2-pyridyl)-3-pyrrolidinoprop-1-ene. These are separated by the base-exchange method of Example 1 and converted to the oxalates. The trans isomer oxalate has M. P. 160–161° (decomp.) after recrystallization from ethanol, and light absorption in ethanol; maxima, $\lambda=234, 281$ m$\mu$; $\epsilon=16,100, 8,200$. The cis isomer base has M. P. 57–58° after recrystallization from light petroleum (B. P. 40–60°), and light absorption in ethanol: maximum, $\lambda=252$ m$\mu$; $\epsilon=14,800$. The cis isomer oxalate has M. P. 174–175° (decomp.) after recrystallization from ethanol, and light absorption in ethanol: maxima, $\lambda=235, 282$ m$\mu$; $\epsilon=12,000, 5,500$.

Alternatively the trans isomer can be readily isolated pure, in the form of its oxalate, by heating with aqueous sulphuric acid (85%) at 170°, using the method of Example 2.

The hydrochloride of 3,4-dimethyl-$\omega$-pyrrolidino-propiophenone, required as starting product for the preparation of the carbinol, has M. P. 169–180°.

*Example 10*

1 - (2 - methylphenyl) - 1 - (2 - pyridyl) - 3 - pyrrolidino-propan-1-ol, prepared by the method of Example 1, and having M. P. 106–107°, is dehydrated in the presence of aqueous sulphuric acid (85%), by the method of Example 1, to give a mixture of the cis and trans isomers of 1 - (2 - methylphenyl) - 1 - (2 - pyridyl) - 3 - pyrrolidino-prop-1-ene. These are separated by the base-exchange method of Example 1 and converted to the oxalates. The trans isomer oxalate has M. P. 160–161° (decomp.) after recrystallization from ethanol, and has light absorption in ethanol: maxima, $\lambda=237$, 281 m$\mu$; $\epsilon=13,700$, 7,300, and in 5 N hydrochloric acid: maxima, $\lambda=217$, 294 m$\mu$; $\epsilon=12,500$, 11,000. The cis isomer has M. P. 169–170° (decomp.) after recrystallization from ethanol, and light absorption in ethanol: maxima $\lambda=231$, 277 m$\mu$; $\epsilon=11,800$, 5,900. In 5 N hydrochloric acid there is a peak at $\lambda=216$ m$\mu$; $\epsilon=12,600$ and a broad band at $\lambda=262$–292 m$\mu$ with a main peak at $\lambda=270$ m$\mu$; $\epsilon=6,600$ and a subsidiary peak at $\lambda=286$ m$\mu$; $\epsilon=6,200$.

The hydrochloride of 2-methyl-$\omega$-pyrrolidinopropiophenone, required as starting product for the preparation of the carbinol, has M. P. 134–135° (decomp.).

*Example 11*

1 - (2,4 - dimethylphenyl) - 1 - (2 - pyridyl) - 3 - pyrrolidinopropan-1-ol, prepared by the method of Example 1, and having M. P. 111–112°, is dehydrated in the presence of aqueous sulphuric acid (85%), by the method of Example 1, to give a mixture of the cis and trans isomers of 1 - (2,4-dimethylphenyl) - 1 - (2-pyridyl) - 3 - pyrrolidinoprop-1-ene. These are separated by the base-exchange method of Example 1 and converted to the oxalates. The trans isomer oxalate has M. P. 168–169° (decomp.) after recrystallization from ethanol and has light absorption in ethanol: maxima, $\lambda=237$, 281 m$\mu$; $\epsilon=15,000$, 8,100 and in 5 N hydrochloric acid; maximum, $\lambda=291$ m$\mu$; $\epsilon=9,000$. The cis isomer oxalate has M. P. 175–176° (decomp.) after recrystallization from ethanol, and light absorption in ethanol: maxima, $\lambda=229$, 273 m$\mu$; $\epsilon=16,000$, 8,400, with a subsidiary peak at $\lambda=281$ m$\mu$ and $\epsilon=8,100$; in 5 N hydrochloric acid the spectrum is a broad band without characteristic peaks.

The hydrochloride of 2,4-dimethyl-$\omega$-pyrrolidinopropiophenone, required as starting product for the preparation of the carbinol, has M. P. 150–152° (decomp.).

*Example 12*

1 - (2,5 - dimethylphenyl) - 1 - (2 - pyridyl) - 3-pyrrolidinopropan-1-ol, prepared by the method of Example 1, and having M. P. 107–108°, is dehydrated in the presence of aqueous sulphuric acid (85%) by the method of Example 1, to give a mixture of the cis and trans isomers of 1 - (2,5 - dimethylphenyl) - 1 - (2 - pyridyl) - 3 - pyrrolidinoprop-1-ene. These are separated by the base-exchange method of Example 1 and converted to the oxalates. The trans isomer oxalate has M. P. 156–157° (decomp.) after recrystallization from ethanol, and has light absorption in ethanol: maxima, $\lambda=237$, 282 m$\mu$; $\epsilon=13,800$, 8,000 and in 5 N hydrochloric acid: maximum, $\lambda=294$ m$\mu$; $\epsilon=10,700$. The cis isomer oxalate has M. P. 176–177° (decomp.) after recrystallization from ethanol, and has light absorption in ethanol: maximum, $\lambda=279$ m$\mu$; $\epsilon=6,900$ and in 5 N hydrochloric acid a broad peak at $\lambda=260$–277 m$\mu$; $\epsilon=6,600$.

The hydrochloride of 2,5-dimethyl-$\omega$-pyrrolidinopropiophenone, required as starting product for the preparation of the carbinol, has M. P. 140–141° (decomp.).

I claim:

1. A compound selected from the class consisting of the free base and its acid addition salts said free base having the formula:

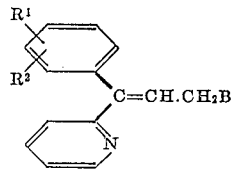

wherein $R^1$ is an alkyl group, $R^2$ is selected from the class consisting of $R^1$ and hydrogen and $R^1$ and $R^2$ together contain not over four carbon atoms, B is an amino radical selected from the class consisting of the pyrrolidino, piperidino and dimethylamino groups and further characterized by the property that its salts in neutral solution have an absorption maximum between 233 and 241 m$\mu$ and another between 280 and 283 m$\mu$.

2. A compound selected from the class consisting of the free base and its acid addition salts said free base having the formula:

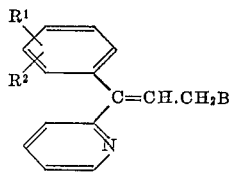

wherein $R^1$ is an alkyl group, $R^2$ is selected from the class consisting of $R^1$ and hydrogen and $R^1$ and $R^2$ together contain not over four carbon atoms, B is an amino radical selected from the class consisting of the pyrrolidino, piperidino and dimethylamino groups.

3. The method of preparing a compound represented by the formula:

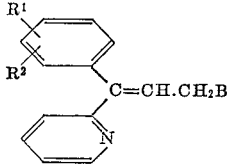

which comprises heating at about 165° C. in 85% sulfuric acid a compound of the formula:

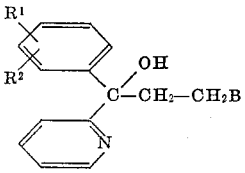

wherein $R^1$ is an alkyl group, $R^2$ is selected from the class consisting of $R^1$ and hydrogen and $R^1$ and $R^2$ together contain not over four carbon atoms, B is an amino radical selected from the class consisting of the pyrrolidino, piperidino and dimethylamino groups and further characterized by the property that its salts in neutral solution have an absorption maximum between 233 and 241 m$\mu$ and another between 280 and 283 m$\mu$.

4. The compound:

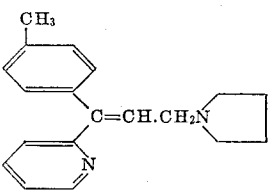

whose salts in neutral solution have absorption maxima at 232.5 and 282.5 m$\mu$.

5. A salt of the compound described in claim 4 having absorption maxima in neutral solution at 232.5 and 282.5 m$\mu$.

6. The compound:

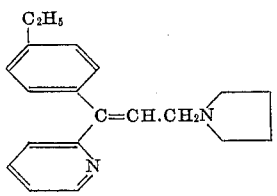

whose salts in neutral solution have absorption maxima at 235 and 282 mμ.

7. A salt of the compound described in claim 6 having absorption maxima in neutral solution at 235 and 282 mμ.

8. A compound of the formula:

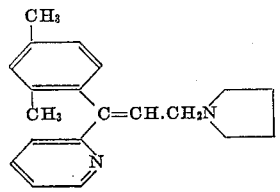

whose salts in neutral solution have absorption maxima at 237 and 281 mμ.

9. A compound selected from the class consisting of the free base and its acid addition salts, said free base having the formula:

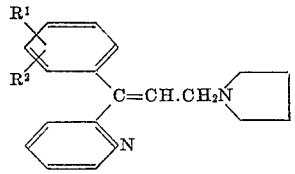

wherein $R^1$ is an alkyl group, $R^2$ is selected from the class consisting of $R^1$ and hydrogen and $R^1$ and $R^2$ together contain not over four carbon atoms.

References Cited in the file of this patent

Idson, Chem. Reviews, vol. 47, p. 518 (1950).